United States Patent [19]

James

[11] Patent Number: 4,890,576
[45] Date of Patent: Jan. 2, 1990

[54] TRANSFORMABLE CONTAINER

[75] Inventor: David F. James, Redondo Beach, Calif.

[73] Assignee: Paw Products, Inc., Los Angeles, Calif.

[21] Appl. No.: 108,061

[22] Filed: Oct. 14, 1987

[51] Int. Cl.$^4$ .......................... A01K 29/00; B65D 5/42
[52] U.S. Cl. .......................................... 119/1; 229/144
[58] Field of Search ..................... 119/1; 229/101, 103, 229/144, 186

[56] References Cited

U.S. PATENT DOCUMENTS

| | | | |
|---|---|---|---|
| 2,914,234 | 11/1959 | Hazelwood | 229/144 |
| 3,154,052 | 10/1964 | Sweeney | 119/1 |
| 3,170,618 | 2/1965 | Sweeney | 229/33 |
| 3,655,115 | 4/1972 | Manizza | 229/186 |
| 3,743,170 | 7/1973 | Riccio | 229/33 |
| 3,840,172 | 10/1974 | Zimmermann | 229/144 |
| 4,331,238 | 5/1982 | Hanko et al. | 229/144 X |
| 4,452,367 | 6/1984 | Wein | 229/186 X |
| 4,791,883 | 12/1988 | Lehman et al. | 119/1 |

*Primary Examiner*—Robert P. Swiatek
*Attorney, Agent, or Firm*—Roth & Goldman

[57] ABSTRACT

A litter box or container holds granulated litter material for an animal's use and is configurable between the shape of a rectanguloid closed container confining the litter material and an open bin or tray in which the litter material is disposed for use. An arrangement of deformable and foldable wall portions in the container permits reconfiguration without removal of the litter material, permitting easy transportation, use and disposal as a unit. The container is formed of sheet material containing fold lines. The fold lines alternately define within the sheet material a closed package that has an essentially square shaped cross section along at least one axis of said cavity and an open tray, the tray having upstanding continuous side walls defining an open cavity, with the volume of the tray cavity being at least twice as large as that of the alternate configuration as a package. Litter material is disposed within said container and is carried between the two configurations. A blank for forming a container and a method for making a transformation of the container allowing the litter to be carried from the tray configuration into the closed package configuration without the need to hand touch the soiled litter are additionally presented.

30 Claims, 2 Drawing Sheets

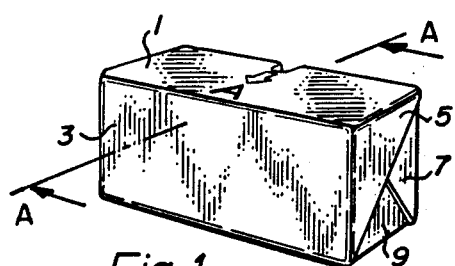
Fig_1
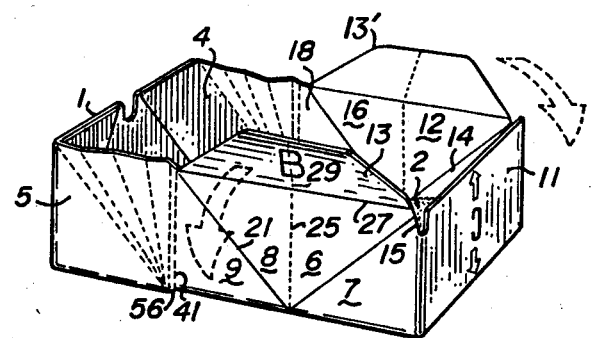
Fig_3
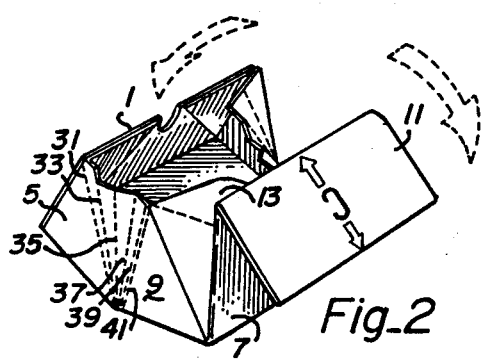
Fig_2
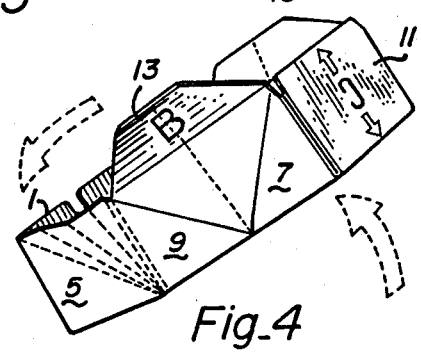
Fig_4
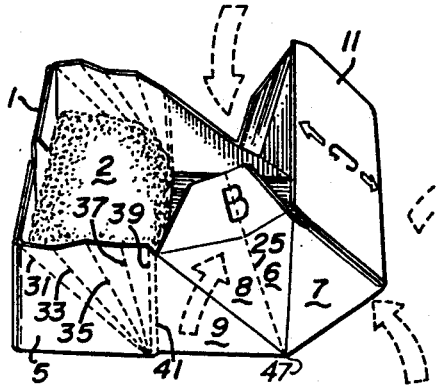
Fig_5
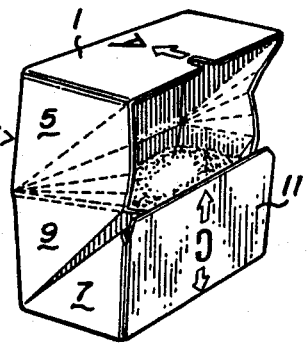
Fig_6
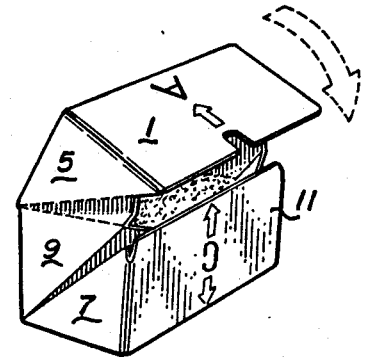
Fig_7
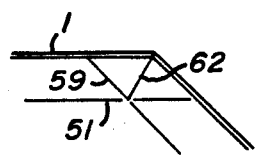
Fig_9a
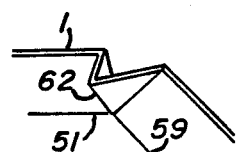
Fig_9b
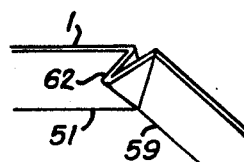
Fig_9c
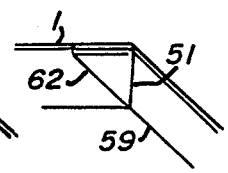
Fig_9d

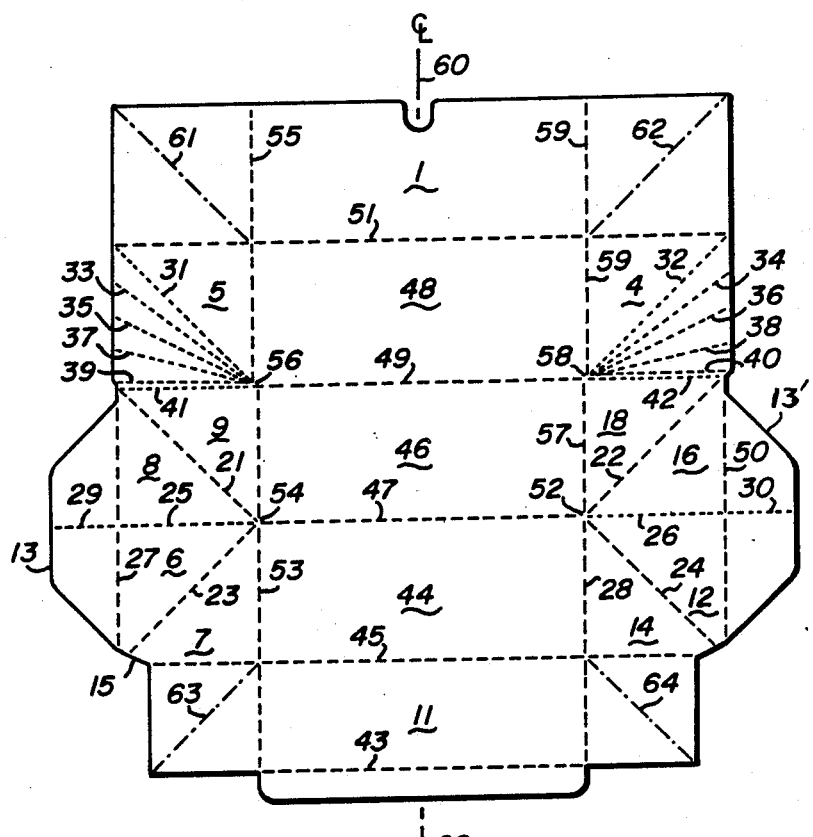
Fig_8
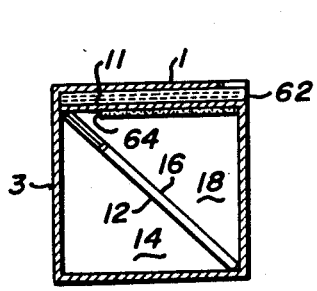
Fig_10
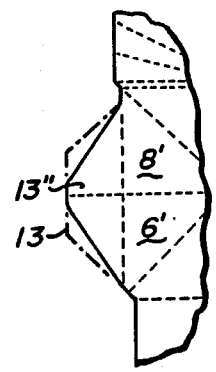
Fig_11

TRANSFORMABLE CONTAINER

FIELD OF THE INVENTION

This invention relates to containers that are transformable in configuration between that of a closed package and that of a bin or tray and vice-versa. More particularly, the invention relates to a completely disposable self packaging animal commode for holding granulated material, such as cat's litter material, and configurable between a package and a tray or bin, serving as a cat's litter box, in which the litter material is transported, used and discarded.

BACKGROUND

Man has long domesticated animals and kept them as pets. There is good reason. Pets offer companionship and protection, a sense of inter-dependency and need, love and loyalty; feelings perhaps not so readily found, in other living things. Chief among the members of the animal kingdom with that status are cats. There is always at least one person among ones circle of acquaintances who owns one or more cats, attesting to the popularity of the feline.

The cat is regarded as a house animal; it usually stays indoors and inhabits the same areas as its owner. The modern person in a wealthy society lives in a comfortable home or apartment that is kept tidy. For the pet cat, provisions are made to allow the cat to relieve itself in-house without dirtying one's home. The "litter box" serves this purpose. It is a cat's "in-house" outhouse, so to speak.

The litter box or bin is a container or tray, having upstanding side walls and a bottom. A volume of granulated material, litter material, is spread over the bottom. The cat easily steps over the side wall and into the bin, relieves itself in the litter material, and then steps out.

Although a person walks away from an outhouse, the pet owner cannot avoid the "used" litter box. It must be cleaned or disposed of to avoid overwhelming fumes; a tolerated disadvantage to cat ownership. Clean-up requires removal of the litter and its discard suitably in a trash can. Cleaning the litter box is regarded as a messy undesirable job and could involve hand contact with the soiled litter. The present invention has the advantage of eliminating that hand contact.

An alternative to avoid hand contact with the litter is to use a disposable box. Because the box size may be cumbersome, disposal of the entire unit in an ordinary trash can be difficult. The present invention provides for a disposable litter box; one that is easy to handle and deposit in the trash can.

Litter material is widespread and popular with cat owners. It is sold in pet stores and in the modern supermarket, the latter being a bastion of "convenience" items and foods to which the modern consumer is "tuned"; a group which, of course, includes the cat owner. Typically, the litter material is sold in paper sacks in quantities of five through twenty-five pounds. Those sacks are heavy, difficult to carry and difficult to pack in with the groceries in the rear or trunk of the automobile. The present invention makes cartage of litter material easier.

The aforedescribed sequence of use and disposal is made more streamlined and convenient by a unitary package litter system which the invention provides; use commences with the purchase of the litter at the supermarket and continues to the ultimate disposal of the litter in the trash can.

In the prior art patent to Sweeney, U.S. Pat. No. 3,154,052 granted Oct. 27, 1964 for a disposable sanitary station for pet animals the subject of convenience in handling of litter material was addressed by providing a transformable litter box, which is also the subject of this specification. The Sweeney patent discloses a litter box made by folding a unitary cardboard blank to form a box or package that is filled with litter. The box may be opened to form a tray with the litter spread about the tray's bottom. After use, the tray is refolded to again define a closed package which is then disposed of in the trash. In this construction, the bottom or base of the tray contains a midsection that is relatively short and the associated side walls contain diagonal scores that criss cross one another.

A second patent to Sweeney, U.S. Pat. No. 3,170,618 granted Feb. 23, 1965 addresses those same goals with a transformable package of slightly different construction but which uses the criss crossed diagonal scores in the midsection side walls. In both packages, the side walls of the box entirely overlap side walls of a second portion of the box in the package configuration and form a generally rectangular cross section shape. Although teaching principles of transformability, Sweeney shows difficulties in the hinge portion about which the portions of the box are formed into the closed package shape.

U.S. Pat. No. 3,743,170 to Riccio is another example of a self contained disposable litter box which like in Sweeney contains three sections that are folded in a counterclockwise folding movement of the end section, carrying with it the midsection, to form a closed package; the cross section of the internal cavity being square shaped. Other than to note, the existence of differences in construction between the structure of the present invention and Sweeney and Riccio as becomes apparent in this specification, it is not possible to fully evaluate the merit or worth of Sweeney's solutions other than to note that such a structure does not appear currently in the market place. One may thus speculate that the Sweeney and Riccio structures have not achieved a suitable result; perhaps the package was not sufficiently sealed and permitted escape of some litter.

A principal object of the present invention is to provide a fold up litterbox system that allows easy disposal of soiled kitty litter without the need to touch that soiled litter and without leakage of loose soil.

An additional object of the invention is to provide a novel package or bin that can be changed from one configuration to the other and vice-versa by simple folding and unfolding the bin or package, respectively, by hand.

A still further object of the invention is to provide a corrugated paperboard unitary sheet design from which a transformable package to tray structure may be easily and inexpensively constructed.

SUMMARY OF THE INVENTION

In accordance with the foregoing objects a litter box system of the type confining a volume of granulated litter material is configured from the shape of a rectanguloid closed container confining said litter material to that of an open bin or tray containing said litter material and vice versa, without removal of said litter material, for transporting, using and disposing of litter material. The system comprises: configurable container means formed of paperboard sheet means; with said sheet means containing fold lines, the fold lines alternately defining within the sheet: a first closed package; the package having a cavity of predetermined volume, V1, and an essentially square shape cavity cross section along at least one axis of said cavity; and to a second open tray, the tray having upstanding side walls defining an open cavity of predetermined volume, V2, where said volume V2 is greater than volume V1 suitably at least twice as great, and a base having three sections, left, center, and right; said fold lines permitting folding of said sheet between said first configuration as a closed package and said second configuration as an open tray by counterclockwise movement of said left base section and clockwise movement of said right base section about said central section and vice-versa by opposite movement in reverse order in reconfiguring from an open tray to a package; and litter material disposed within said configurable container means that is carried from one cavity to the other.

The foregoing and additional objects and advantages of the invention, together with the structure characteristic thereof, which was only briefly summarized in the foregoing passages, becomes more apparent to those skilled in the art upon reading the detailed description of a preferred embodiment and the claims describing the invention, which follows in this specification, taken together with the illustrations thereof presented in the accompanying drawings.

DESCRIPTION OF THE DRAWINGS

In the drawings:

FIG. 1 illustrates an embodiment of the invention in perspective view;

FIG. 2 illustrates in perspect the embodiment of FIG. 1 in a partially transformed condition;

FIG. 3 is a perspective view of the litter box configuration of the invention;

FIG. 4 illustrates a step of positioning the litter box for transformation into the package configuration illustrated in FIG. 1;

FIGS. 5, 6 and 7 illustrates three additional steps taken to reconfigure the box, containing the enclosed litter material, into the closed package illustrated in FIG. 1;

FIG. 8 is a top view of a cardboard sheet containing appropriate scores to form the transformable package of FIG. 1;

FIGS. 9a through 9d illustrate in perspective the manner in which the side walls of the box are assembled from the two dimensional sheet presented in FIG. 8;

FIG. 10 illustrates a cross section view of the embodiment of FIG. 1 taken along the lines A—A; and FIG. 11 illustrates a modification of the flap used in the embodiment of FIG. 8.

DETAILED DESCRIPTION OF A PREFERRED EMBODIMENT

The drawings are illustrative of a preferred embodiment of the invention and thus contain details pertinent to that embodiment. The invention, however, is not so limited. Inasmuch as the details of an embodiment may be varied in accordance with the principles of the invention as presented herein by the exercise of routine engineering skill and, as varied, the illustration of another embodiment is understood will differ in respects from the illustrations presented in the drawings. The preferred embodiment of the invention is the elongate rectanguloid package formed of corrugated paperboard and containing six sides as is presented in FIG. 1 in perspective view to which reference is made.

The package includes a rectangular shaped wall or panel 1, as variously termed, a second rectangular shaped panel 3, which serves as a left section of the bottom of the formed box or tray in the alternate configuration later described, and a side end formed of a side panel, only a triangular portion 5 of which is illustrated in the figure, overlying a triangular panel portion 7 and with the latter overlying a third triangular portion of another panel 9, and other walls not visible in this figure which together form a closed package, the details of which become more apparent from the detailed description which follows in this specification. The two elongated rectangular walls that are not visible in this view correspond in shape to the oppositely positioned walls 1 and 3 with minor difference. The finger hole such as is formed by a cut in the top panel illustrated is not included in the corresponding wall. Moreover, the configuration of the remaining side opposed to that square shaped end side illustrated on the right in the figure is of a like construction. Litter material is confined in the closed package.

The reconfiguration of the package of FIG. 1 to a tray is illustrated in FIGS. 2 and 3. In the illustration of FIG. 2, the package is shown partially transformed or unfolded. Wall panel has been rotated counterclockwise, approximately 45 degrees from a vertical position overlying panel 11, exposing the latter panel to view. In turn panel 11 has been rotated clockwise in position by approximately 45 degrees as indicated by the dash arrows in the figure. As illustrated, the side panel, containing triangular panel portion 5, contains a deformable or pleated section containing perforated scores 31, 33, 35, 37, 39 and 41 that extend radially from a position at the intersection of two side panels upward to various positions along the upper edge of the left side panel as illustrated, which section was concealed in the prior view. Wall panel portion to the right of score 41 contains four triangular shaped folded sections, including 7 and 9, and a top flap 13 that was folded in half over into the cavity within the box. The panel elements contained on the opposite side of the unit, not fully visible in FIG. 2, are of like construction.

When completely unfolded, a tray or bin is formed, which serves as a litter box, as illustrated in the perspective view of FIG. 3 in which, for convenience, like elements previously illustrated in FIGS. 1 and 2 are identically labeled. The box contains a layer of granulated litter material 2 spread over the bottom, only a portion of which is visible in this figure. For convenience wall 1 is sometimes referred to as the left wall; the forward most side wall, containing portion 5, is referred to as the front or forward wall; and the wall opposed in position to the forward wall may be referred to as the rear or rearward wall since these are the relative locations as the embodiment is viewed in FIG. 3. The references are understood to appropriately change if one views the embodiment from the opposite side than illustrated in FIG. 3. As better illustrated in this view, the forward side wall is divided into three major sections bordered by fold lines. When unfolded the three sections form an upstanding side wall portion to the bin. The first two integrally attached sections contain triangular shaped portions 7 and 6, the latter of which is inverted, and 9 and 8, the latter of which is inverted, and correspond in position to the right and center position of the tray's bottom, as later described in detail. These two sections are capped by the foldable upstanding protrusion or flap 13. The corresponding sections of the rearward side wall or panel is partially visible in the figure. This includes triangular panel sections 14, 12, 16 and 18 and the right flap 13'. This wall contains corresponding fold lines. At its upper end integrally attached flap 13 may be folded outwardly as represented by the arrow by approximately 90 degrees along the score to stiffen the scored left side wall.

The forward wall contains ruled scores 21 and 23 and perforated score 25, bisecting the panel into two parts between scores 41 and 45. A ruled score 27 serves to define the border with flap 13. The flap includes a ruled score 29 that is coaxial with score 25 so as to allow the flap to be folded in half.

The third section of the forward side wall located to the left of score 41, contains panel section 5 and includes the series of straight perforated scores identified earlier in FIG. 2 as 31, 33, 35, 37 and 39 and 41, the latter two of which are in parallel. The corresponding section 4 of the rearward side wall and the deformable portion containing the radially spaced perforated scores is partially visible in this view.

The fold lines formed in the sheet material allow the reconfiguration of the container. These fold lines are formed by scoring the surface of the cardboard sheet, using various conventional "scores", including ruled scores, cut scores, and perforated scores. As is known to those skilled in the art, a ruled score in cardboard sheet material allows the cardboard to be bent easily in one direction, a direction toward the score side. A cut score is one in which a cut is made deeply into the sheet almost all the way through the material. The cut score allows the material in which the score is formed to fold away from the score. A perforated score consists of a series of spaced straight cuts through the material which are separated by uncut portions of material as illustrated in the figure, a series of perforations in a track. A perforated score allows bending or folding either way, inwardly or outwardly.

As shown in the figure, the wall portion contains a chamfer or taper 15 at its right side adjacent wall panel 11, partially detaching adjoining walls. This allows the upper end of wall 11 to slightly flex. This flexibility is enhanced by an additional ruled score, not illustrated in this figure, but illustrated in FIG. 8 discussed later. The left side panel of the box is shown to undergo or contain a crimp or jog 56 at the juncture of the two sections, which is exaggerated in this view for purposes of illustration. As is apparent to the reader, the section of the container which includes panel portion 5 and wall 1 is of a slightly greater internal length and heighth or width, which becomes more apparent from inspection of the blank shown in FIG. 8. That enlargement permits the leftmost box section to be folded over the other sections as presented in the closed container or package configuration as illustrated in FIG. 1. A slight cut out or notch is also formed in the top edge about score 41 between the side wall flap and adjacent panel section to eliminate some material as would resist the folding operation later described.

The entire package is preferably formed of a single blank of cardboard sheet material, as described hereafter in greater detail in connection with FIG. 8, and the insides of the package are preferably coated with a moisture impervious coating, suitably wax or plastic which is not visible in the figure.

As assembled for use as depicted in FIG. 3, the kitten is permitted to use the litter box and do its "duty". At an appropriate time, the litter box is folded back up into a closed package in a manner that avoids need for any contact between the pet owners hands and the litter material. This reconfiguration or transformation is illustrated in FIGS. 4 through 7, which further assists to understand the invention, to which reference is made. It is noted that this reconfiguration is essentially the same procedure used by the manufacturer to initially assemble and pack the commode. Hence, the fold lines were initially earlier stressed and it is easier for the pet owner to refold the package.

The right end of the box shown on the right side in FIG. 4, is rotated or raised upwardly by hand as indicated by the dash arrow, tilting the box about the axis formed at the juncture of wall 1 and the bottom panel portion, effectively creating a slide for the litter material. This action moves the confined litter material into the left third section of the box; that movement being represented by the dash arrow. If need be, the box may be vibrated or tapped to insure movement of the litter granules in that direction.

With the granulated litter material 2 collected on the left side as represented in FIG. 5, the box is rotated back to its level position, resting on the floor or other surface. Wall 11 is then hingedly rotated upwardly counter clockwise about a fold line 47, the end of which is represented in the figure and which may be fully viewed in FIG. 8. This pivoting or rotational movement is represented by the rightmost dashed arrow. The side panels in the forward wall respond by folding inwardly about fold line 25. The corresponding wall portions on the opposite side of the box are similarly folded inwardly in like action. Ideally this latter fold action occurs automatically as the section containing wall 11 is rotated upwardly. Wall 11 is rotated through a complete approximately ninety degree angle, leaving that wall spaced parallel to and overlying the center midsection of the box's base, not visible in the figure, located between score 47 and 49 visible in the view of FIG. 8. Then the entire package is rotated from the opposite side by manually raising wall 1 to an elevated horizontal position as illustrated in FIG. 6 in which the bottom of the left section is oriented vertical.

The litter material earlier collected at the left end abutting wall panel 1 now moves downwardly into the cavity formed at the right end by the furthermost section containing wall 11 an side wall portion 7. As shown in the figure, the two inverted triangular portions 6 and 8 bordering the center and right tray sections and the corresponding portions in the rearward side wall, including the flaps, are now folded into the package and the hypotenuse of triangular portion 9 is coming into contact with the hypotenuse of triangular portion 7 to reform the square shape end earlier viewed in FIG. 1. In the course of movement, at least some of the granules strike the sides of the inwardly folded wall portions 8 and 16, which shunts or chutes those granules to the bottom. In this action, the flap serves to isolate the corner of the side wall from the granulated material. That is, the flap basically extends the juncture of the wall so as to prevent the corner as folded in from digging into the granulated material and/or allowing significant portions thereof from flowing out into the fold crevice. Were that to occur, some of the granulated material might thus spill out unto the floor through the crevice between the wall panel portions. In addition to serving a wall stiffening function as previously discussed, flap 13 thus acts as a barrier or inhibitor to preclude significant amounts of granulated material from seeping into the crack during this transformation process.

As indicated by the dash arrow in FIG. 6, the remaining package section, containing wall 1, is now rotated clockwise about a fold line. As that rotation movement continues, the deformable section of the side panel and the corresponding panel on the opposite side deforms, assisted by the multiple perforated fold lines. Initially that side panel portion bows inwardly during this process as it is squeezed by the rotational force. The perforated lines 31-39 in the triangular portion make that portion more easily deformable as compared to the sections that do not contain such perforations. Hence when the section shown on the left is rotated, the deformable portion bows and deforms and is pulled, twisted around by the remaining triangular portion 5 of this section to which the deformable wall portion is connected, an action difficult to characterize with words, into the space between that remaining triangular wall portion of the same tray section and the underlying triangular wall portion 9 of the center section of the tray in the course of which the face of the deformable triangular portion viewed in the figure that as viewed in the figure faces outward of the tray cavity, reverses and faces toward the tray cavity.

As represented in FIG. 7, the remaining tray section appears hingedly rotated through approximately 45 degrees, the pleated section bows inwardly and is reformed along the triangular section. The deformable side wall panel section is drawn in part in between triangular shaped panel portion 5 and portions 9 and 7 so as to allow the section to be fit over side panel 7. A like effect occurs with the deformable wall portion located on the opposite side of the container. In the final step, wall panel 1 is hingedly rotated further, through essentially a complete ninety degrees from the position earlier illustrated in FIG. 6, so that left wall 1 overlaps and covers and is essentially parallel to right wall 11, which also makes that wall parallel and to the underlying midsection of the base, to reform the package of FIG. 1. The friction between the side wall sections as they are squeezed together assists to hold the package together without use of sealing tape. As previously described, the upper edge of wall 11 includes a flexible upper flap like portion. As wall panel 1 contacts that upper edge during the folding process, the upper edge of wall panel 11 flexes slightly, allowing wall 1 to pass, so as not to act as a barrier or make the transformation difficult. In the reverse direction, the upper end of wall 11 adds friction as it presses against the underside of wall 1. This assists in maintaining the package closed.

The internal cavity formed by the closed package is essentially square in shape as best illustrated in FIG. 10. As there shown panel 1, which contains the attached corner fold material 62, overlies and is essentially parallel to panel 11, which contains the attached corner fold material 64, visible in this view. The corner fold material intrudes slightly into the cavity, but does not detract from the square cross section shape. The folded triangular wall panels 6' and 8' that are hingedly attached to the remaining triangular shaped panels 14 and 18 forming a portion of the side wall and the extending flap which it supports are shown in folded position. The panels 12 and 16 and flap intrude into the formed package cavity. This folding action was previously described in connection with the previous discussion of FIGS. 5 through 7. It is noted that the thickness occupied by the folds 62 and 64 in this illustration are purposefully illustrated as greater in proportion to the size of the other elements and is thus somewhat exaggerated to assist in understanding the description of the invention.

To better show the details of construction, reference is made to FIG. 8 in which a relatively two dimensional, essentially flat sheet of cardboard material or cardboard "blank" containing the appropriate fold lines is illustrated. The cardboard blank is illustrated in the preferred geometry. It contains the fold lines necessary to form the embodiment of the invention presented in FIGS. 1 and 3, previously described. For convenience elements previously discussed in connection with those earlier illustrations are identically labeled in this figure. The sheet layout is generally rectangular in shape modified with a protruding portion on each of the left and right sides in the figure and with the lower section of lesser length than the upper portion. The sheet is cut to the geometry illustrated from a larger blank sheet, by means known to those in the packaging art, and, hence, the cutting procedure need not be described in detail. Likewise the scoring hereinafter described preferably is accomplished automatically and may be accomplished by hand.

As illustrated the blank is essentially symmetrical about center line 60. It is thus understood that the elements to the left side of the center line, which are described in detail hereinafter, find corresponding elements to the right side of the center line and, hence, the description of those corresponding elements need not be described in detail.

As illustrated the blank contains a series of five ruled scores proceeding from the front end on the bottom of the figure, 43, 45, 47, 49 and 51. These straight scores are spaced apart essentially parallel to one another. The distance between scores 45 and 47, and between scores 47 and 49 are essentially equal, while the distance between scores 49 and 51 is slightly larger than the former distance. These straight scores defined the width of the right 44, center 46 and left 48 rectangular shaped sections of the box's bottom or base as previously discussed. A second series of ruled scores 53, 55, 57 and 59 extend perpendicular and intersecting relationship with some of the above identified scores. As illustrated the horizontal distance between scores 53 and 57 is slightly smaller than the corresponding distance between scores 55 and 59 and both sets of parallel scores are located symmetrical about center line 60. As shown, scores 55 and 53 intersect score 59 at slightly different horizontal locations leaving therebetween a "jog" 56. A like jog 58 formed between parallel scores 57 and 59 appears at the corresponding location to the right of center line 60. Although ruled score 55 is parallel to ruled score 53, they are not coaxial. A straight perforated score 41 extends coaxial with score 47 from the end of score 47 to the leftmost edge in the figure. A corresponding perforated score 42 extends from the end of and coaxial with score 49 to the right edge in the blank in the figure.

Ruled scores 21 and 23 and perforated score 25 extend from location 54, which is the intersection of scores 53 and 47 radially outwardly; score 21 extends at a 45 degree angle upwardly to an edge of the panel adjacent the left end of score 41 and score 23 extending downwardly at a negative 45 degree angle to the left edge of the panel, at the location containing the taper 15. Score 25 extends coaxial with score 47. Perforated score 29 extends coaxial with score 25 through flap portion 13 intersecting a ruled score 27 defining the flap portion, the dividing line between the flap and the side wall.

A like relationship exists for the corresponding elements to the right of center line 40 in the figure with ruled scores 22 and 24, perforated scores 26 and 30, and ruled score 50, the latter of which defines a flap portion to the side wall.

Scores 31, 33, 35, 37 and 39 fan radially outwardly from a location 58 adjacent the jog location 56, the intersection of scores 55 and 41, earlier described to various positions, evenly spaced, along the outer left edge in the figure. Perforated score 31 extends at an approximate 45 degree angle to the outer left edge of the blank, defining a border to triangular shaped wall portion 5, and intersects ruled score 51 at that edge. The remaining scores 33, 35, 37 and 39, as illustrated, also extend from that central location at various lesser angles with respect to score line 39 so as to form a deformable, bowable, pleatable, perhaps amorphous in a search for words, or bellows like wall section upon assembly. Score 39 is essentially parallel to score 41. A like series of perforated scores 32, 34, 36, 38 and 40 are included on the right side of the blank in the figure.

All score lines show all essentially straight. At least the bottom sections are coated with a moisture impervious plastic coating or film, which need not be separately illustrated.

The blank also contains a series of cut scores 61, 62, 63, and 64 which form corner folds. Each of these scores extends at a 45 degree angle between the corresponding adjacent outer corner of the blank and the inner section of the most immediately located intersecting ruled scores.

The blank is then assembled into the form of the tray, and is then folded into the package configuration to pre-stress the package along the appropriate fold lines. The package is then opened slightly or fully and the requisite amount of litter material is then deposited therewithin and the package is closed. A small piece of tape may be applied between the wall and the bottom panel if desired to insure that the package is not tampered with while on the store shelves. As formed, however, the package retains its closed position without the tape due to friction between the panel elements.

As previously described, litter material is deposited within the package at the factory. This is introduced as loose material or, alternatively, it is included in an elongate paper or plastic bag which is then placed in the container. The latter arrangement minimizes the possibility of escaping dust while the package is on the store shelves or in the assembly operation. Should such a bag be used, it is desirable to alter slightly the shape of the flap 13 and the corresponding flap on the opposite side to a geometry represented in FIG. 11 as 13″, discussed later. This allows sufficient clearance during assembly and permits the flaps to be inwardly folded, avoiding such contact the bag as might otherwise obstruct that step. In as much as the bag arrangement holds the granulated material in a fixed condition which is not the case when the granulated material is introduced loosely and may be pushed aside by the flap.

Although it may be self evident to the reader, the formation of the upstanding walls, including the formation of the corners to the box, previously only briefly mentioned is illustrated in FIGS. 9d through 9d in which the formation of a single corner is illustrated in steps. Thus in FIG. 9a, one corner of the blank is illustrated. The two lines are folded upwardly and the corner folds inwardly along the lines of the cut fold. As shown in FIG. 9c, the fold is then compressed so that its sides are together and the fold is then attached by glue or staples to one of the flat side walls 1 as illustrated in FIG. 9d. The remaining three corners are similarly formed and fixed in place to either wall 1 or wall 11 to form rigid corners. As is apparent if the corner folds were attached to the deformable or foldable side walls, the corner folds might interfere with operation of the package. Fastening to the side walls 1 and 11 thus represents the best choice in this combination. An advantage of the disclosed corner construction is that it does not produce an opening or crack in the corner areas through which litter material might escape. While the corner construction described is preferred, as those skilled in the art appreciate there are other known corner constructions which, though less preferred, are less costly and may be substituted for the preferred construction without detracting from the invention. All of the aforedescribed assembly operations may be performed by hand or, alternatively, may be performed by automatic equipment, performing those operations automatically.

Although not necessary to the understanding of the invention, exemplary dimensions for the preferred embodiment are given. The distance between the edge of wall panel 11 and ruled score 3 is 1.25 inches; the distance between score 43 and 45 is 4.75 inches and between the edge of wall panel 11 and score 45, 6.00 inches; between 45 and 47, 6.00 inches; between 47 and 49, 6.00 inches; between 49 and 51, 6.25 inches; between 51 and the upper edge of wall panel 1 of the blank, 6.00 inches. The overall length of the blank from top to bottom in the figure is 30.25 inches.

The distance between scores 55 and 59 is 14.50 inches and between scores 53 and 57, 14.00 inches so that the axial displacement or "jog" between the axis of the scores 53 and 55 is 0.25 inches. The distance between scores 53 and 27 is 6.00 inches; between score 27 and the top edge of flap 13, defining the heighth of the flap 13, 3.00 inches; between score 55 and the outer edge of wall panel 5, 6.00 inches; between score 59 and the rightmost panel edge in the FIG. 8, 6.00 inches. The overall width of the blank from the leftmost edge of flap 13 to the rightmost edge of the corresponding flap portion on the right hand side in FIG. 8 is 32.00 inches.

The notch or recess bordering the upper edge of the flap at line 39 is approximately 0.25 inches deep and extends about 0.75 inches from line 39. The right lower edge of wall panel 7 is tapered from a position 0.50 inches upward of the axis of score line 45 to the intersection of the right edge of the wall panel 11 and score line 45, forming an approximately 70 degree angle to score line 27. The same dimensions are provided for the notch and taper on the right hand portion of the blank of FIG. 8.

The distance between the axis of score line 27 and the axis of the leftmost edge of wall portion 11 in the figure is 1.25 inches. The distance between the centerline and the left edge of the flap like portion of wall panel 11, coaxial with score line 53, is 7.00 inches and between score line 53 and the leftmost edge of the wall panel 11, 4.75 inches.

The distance between perforated score 39 and 41 is 0.25 inches and the two scores are essentially parallel. The angular distance between scores 39 and 37 is 14 degrees and the distance apart when measured along the outer edge of panel 5 is 1.50 inches; between scores 37 and 35, 13 degrees with the spacing at the outer panel edge 1.5 inches; between scores 35 and 33, 10 degrees with the distance at the outer panel edge, 1.50 inches; between scores 33 and 31, 8 degrees and with the spacing therebetween at the outer panel edge, 1.50 inches. Line 31 extends from the lower corner at an angle of 45 degrees to the upper corner of the panel portion. It is recognized that these angles are not critical and may be varied within reason to perform the required function. As is evident from the foregoing the corners at the bottom side is a 6.00 by 4.75 inch dimension, whereas the corner portions at the top are 6 inches by six inches.

By way of example B-flute corrugated paperboard may be used. This paperboard is of a thickness of approximately 0.10 inches. It is emphasized that the sheet material may be of any flat stock material suitable for this purpose. Although corrugated paperboard is used in the embodiment, non corrugated paperboard may be chosen instead for other embodiments; plastic impregnated paperboard, or simply forms of plastic, fiber, or equivalent sheet may be selected instead as appropriate. Thus, the term 'paperboard' is used in this specification in the generic sense and encompasses all equivalents.

Granular absorbent material forming the litter appears in many forms. Ground clay is particularly effective because of its highly absorbent, odorless and granular characteristics. Sand, sawdust or diatomaceous earth are also useful in this application. Attapulgite which is a type of clay, sometimes referred to as hydrated magnesium aluminum silicate and also known commonly as Fullers Earth, is a most popular application.

The container as shown includes a base that is surrounded by four upstanding walls in the tray form of FIG. 3 and these walls are essentially continuous. In the tray form an open cavity of a predetermined volume is defined; in the form of a closed package a closed cavity of a smaller volume is defined, and that cavity is essentially of a square shaped cross section, when sectioned along one axis and of a rectangular cross section, when taken along the perpendicular axis and disregarding the minor thickness of the corner folds illustrated to enlarged scale in certain of the figures. As is evident from the foregoing description the base of the container is divided into three sections by the ruled scores; the back section, the one 48 to the left in the tray configuration of FIG. 3 between fold line or score 49 and wall 1, which may be referred to as the back wall; the midsection 46 between score lines 47 and 49; and the front section 44, the one to the right in the tray configuration of FIG. 3 between score 47 and wall 11, which may be referred to as the front wall. As is shown in FIG. 8 and by the exemplary dimensions given, the front and midsections are essentially equal in length and width. The back section, however, is slightly larger in those dimensions inasmuch as the back section must be able to clear or fit over the midsection and front wall 11 when the back wall is hingedly rotated clockwise as was depicted in FIG. 7.

The aforedescribed animal commode may be used with loosely packed litter material as was described in connection with the preceding embodiments or, alternatively, may have the litter material confined initially within a paper or polyethelene bag. In the latter instance, the bagged litter is installed by the manufacturer at the time the manufacturer assembles the commode and transports same to the store. Such a modification ensures that handling of the package is dust free. However, use requires a slight change in the users procedures. A knife may be used to slit open the bag or the bag may be torn open and the user may deposit the litter by holding the bag, avoiding the need to touch the litter by hand.

Should the litter material be bagged before insertion in the package, it may be desirable to modify the shape of flap 13 somewhat from the illustrative geometry presented in the prior illustrations to minimize interference that the bagged litter material may cause during initial packaging at the manufacturer. FIG. 11 illustrates the slight change that may be made to the flap while the blank retains overall the same essential geometry as was presented in FIG. 8. This is presented as flap 13". The flap detail or design is more pointed and has a narrower top edge than the flap in the prior embodiment, which is represented by the invisible lines 13. A simple calculation using the given dimensions of the specific example shows that the length of the left base section as measured between scores 55 and 59 is one-half inch greater, only slightly greater than the fourteen inches of the corresponding dimension of the center base section as measured between scores 53 and 57; it is approximately 3.6 per cent larger. A like calculation on the width shows that the width of the left section is one-quarter inch greater, only slightly greater than the six inch of the corresponding dimension of the center base section, approximately 4.2 per cent larger. In percentage a further simple calculation ($1.036 \times 1.042 \times 1.000$) shows the volume of the left box section to be about 8% larger than the mid section.

The volume, $V_1$, of the package has been compared in connection with the volume, $V_2$, of the open tray configuration. A simple calculation using the dimensions given in the specific embodiment yields a volume of 504 cubic inches for the package based on the distances between score lines 53:57, 47:45, and 53:27. Similarly the calculation of the volume of the open tray is found to be 1,533 cubic inches based on the sum of the distances measured between scores 45:47, 47:49, and 49:51; multiplied by that between scores 53:57 and again by that distance between scores 53:27. Thus the tray of the example is of a volume about three times as large as that volume defined between the inner walls of the closed package. In effect a portion of the flap 13 of the prior embodiment is cut away, allowing the sides or flap to better clear the bagged material in the initial folding operation, which is essentially as depicted in FIGS. 5 through 7. The best geometry is determined through trial and error and depends in part upon the size and shape of the bag of litter material that one wishes to enclose and the dimension of the container.

It is believed that the kinds of fold lines given in the preferred embodiment and the placement of same accomplish the desired purpose. It is recognized however that those skilled in the art may select different kinds of scores or change the placement and detail of the scores that also accomplish the invention as well as to add different features. For example, some of the ruled scores may be replaced by perforated scores and/or by cut scores and vice-versa with a similar result. It is believed that the kind and type shown represents the best choice. Likewise the shape of the package as preferred is rectanguloid. However, it can easily be formed in a cube shape. Other modifications are possible. For example, a handle may be fabricated into the walls 11 and 1 by die cutting u-shaped sections within the walls 1 and 11 that may be pressed out for use. Although that would create a slight opening with the handle withdrawn and even less of an opening when left flat in the wall, the container is still regarded as essentially closed, a closed package.

The container illustrated and described eliminates handling of the confined litter. It is self packaging. It does not permit spillage of any significant litter during repackaging. Since both the litter and box are provided as a unit, the need for a separate supply of litter and a separate tray is eliminated.

It is believed that the foregoing description of the preferred embodiment of the invention and accompanying illustration is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. An animal sanitary system for transporting, using and disposing of litter material free of spillage, which comprises: a quantity of litter material; configurable container means formed of paperboard sheet means for confining said litter material; said sheet means comprising a unitary sheet containing fold line means, said fold line means alternately defining within said sheet means: first closed package means and second open tray means; said package means defining an enclosed cavity of predetermined volume, V1, for holding said litter material; said cavity having an essentially square shape cross section along at least one axis of said cavity; said tray means having upstanding continuous side walls and a generally rectangular base defining an open cavity of predetermined volume, V2, for holding said litter material and for receiving there within in addition a litter material using animal to use said litter material, where said volume V2 being at least twice as large as volume V1, and said base having three sections of approximately equal area, including a left, center and right section; said fold line means for permitting folding of said sheet means between said first configuration as a closed package means to said second configuration as an open tray means responsive to pivotal movement of said left base section about said center base section in one direction and pivotal movement of said right base section about said center base section in another direction opposite to said one direction with portions of two opposed walls moving outwardly from said enclosed cavity responsive to movement of said right base section and with said litter material being carried from said package means cavity into said tray means cavity and for permitting folding of said sheet means between said second configuration as a tray means to said first configuration as a package means responsive to pivotal movement of said right base section in said one direction about said base center section followed by pivotal movement of said left base section about said base center section in said another direction with said litter material being carried from said tray means cavity to said package means cavity with said two opposed wall portions moving inwardly of said defined open cavity responsive to pivotal movement of said right base section in said one direction.

2. The invention as defined in claim 1 wherein said continuous upstanding side walls of said tray means includes first and second tray walls, said first and second tray walls being spaced from one another and positioned on opposite sides of said base, each of said first and second tray walls including a top and a bottom and including:

first, second, third and fourth right triangle shaped portions, each including a base, height and a hypotenuse, said right triangle shaped portions being essentially congruent and arranged to form a rectangle, said base of each of said second and third triangle shaped portions being oriented at said top and said base of each of said first and fourth triangle shaped portions being located at said bottom; said fold line means including first and second sets of fold line means located in said first and second tray walls, respectively, each of said first and second sets of fold line means including: first fold line means for hingedly connecting said first and second right triangle shaped portions along the respective hypotenuses thereof; second fold line means for hingedly connecting said third and fourth triangle shaped portions along the respective hypotenuse thereof; and third fold line means for hingedly connecting said second and third triangle shaped portions along the respective bases thereof; and each of said first and second tray walls further including:

fifth and sixth right triangular shaped portions, each of said fifth and sixth right triangular shaped portions containing a base, a height, and a hypotenuse and said fifth and sixth triangular shaped portions being arranged to form approximately a square with said base of said fifth triangular portion being oriented at said top and said base of said sixth being oriented at said bottom, said formed square being located contiguous to said formed rectangle; said fifth triangular shaped portion being bowable and deformable;

and wherein each of said first and second sets of fold line means further includes a plurality of angularly spaced straight perforated scores extending from an intersection of said hypotenuse and said height of said fifth triangular shaped portion to various positions along said base of said fifth triangular shaped portion to provide a bowable deformable characteristic to said fifth triangular shaped portion.

3. The invention as defined in claim 1 wherein said tray means includes first and second walls of predetermined height, said walls being spaced from one another by a predetermined distance and each of said first and second walls containing a top and a bottom, and further comprising: a flap, first fold line means hingedly attaching said flap to said top of said wall and second fold line means located orthogonal to said first fold line means and bisecting said flap to divide said flap into two hingedly connected portions; said flap being of a height that is less than one half the sum of said predetermined distance and said predetermined height.

4. The invention as defined in claim 1 further including a moisture barrier coating covering said base section of said tray means.

5. A configurable container for transporting, using and disposing of litter material which comprises:

paperboard sheet means, said sheet means comprising a unitary sheet and containing fold line means, said fold line means alternately defining within said sheet means: first closed package means, said package means having a package cavity of predetermined volume, V1, and an essentially square shape cross section along at least one axis of said package cavity, and second open tray means, said tray means having upstanding continuous side walls and a base defining an open tray cavity of predetermined volume, V2, where V2 is at least twice as large as V1;

said fold line means for transforming said paperboard sheet means between said first configuration as a closed package means and said second configuration as an open tray means, said fold line means including first fold line means and second fold line means located in said base for dividing said base into three approximately equal size sections;

said sections of said tray means base comprising: left, center and right base sections; and said tray means side walls including left and right outer walls;

said right base section being hingedly foldable counterclockwise of said center base section by approximately ninety degrees to place the right outer wall of said right base section essentially parallel to and overlying said center base section;

said left base section being hingedly foldable clockwise of said center base section by approximately ninety degrees to place said left outer wall of said third base section essentially parallel to said center base section and over said right outer wall;

said tray means side walls further including: forward outer and rearward outer side walls between said right outer and back outer walls, a portion of each of said forward outer and rearward outer side walls bordering said center and one of said left and right base sections;

a pair of foldable flap means, said pair of foldable flap means being located on and carried by corresponding ones of said forward outer and rearward outer side walls, respectively, at the top side thereof, each said flap means extending lengthwise over said center and right base sections;

each of said forward outer and rearward outer side walls, containing first, second, third, and fourth hingedly attached triangular shaped portions arranged to form a rectangle, each of said triangular shaped portions including a base, height and a hypotenuse;

a first adjacent two of said first through fourth triangular shaped portions being foldable inwardly into said cavity responsive to pivoting in one direction of said right base section and said remaining two first through fourth triangular shaped portions being moved into a contiguous position with one another to form a square shaped end wall responsive to said pivoting;

each of said forward outer and rearward outer side walls further including: fifth and sixth triangular shaped portions defining essentially a square shape and being located adjoining said formed rectangle defined by said first through fourth triangular shaped portions;

one of said fifth and sixth triangular shaped portions having the respective base located at said top and containing a series of radially directed angularly spaced perforated score lines extending from an apex at said bottom to provide a deformability characteristic to said one of said fifth and sixth triangular shaped portions, said one of said triangular shaped portions containing said perforated scores being deformable responsive to pivotal movement of said left base section for permitting said other triangular portion of said pair to fit over said formed square shaped end wall to further define a square shaped wall.

6. In combination: a bin having a bottom surface and four upstanding side walls arranged in two pairs with a first pair of said side walls being spaced in opposed relationship and a second pair of side walls being spaced in opposed relationship, said first pair of walls being joined together with said remaining pair of side walls; a pair of fold lines in said bottom surface oriented essentially parallel to said first pair of walls, said fold lines being spaced essentially equi-distant from each other and from a respective adjacent one of said walls of said second pair of walls to divide said bottom surface into three hingedly connected sections of approximately equal size with the one of the sections located adjacent a second wall of said first pair of walls being slightly larger in size than the two remaining sections of said three sections; said fold lines permitting a first wall of said first pair of walls to be arcuately moved about a first one of said fold lines by approximately ninety degrees of arc to a position overlying a portion of said bottom surface located between said pair of fold lines with portions of the two walls of said second pair of walls being moved toward one another a limited distance and the second wall of said first pair of walls arcuately moved about said second one of said fold lines by approximately ninety degrees of arc and to permit said second one of said first pair of walls to overlie and cover the first one of said first pair of walls upon the completion of said respective ninety degrees of arcuate movement of each such walls in said first pair of walls.

7. A sanitary station for an animal containing in combination litter material and a transformable tray, said tray comprising: a base and four side walls upstanding from said base defining a tray cavity; said walls including a left side wall and a right side wall and forward and rearward side walls; said base containing a center section and left and right sections located to each of the left and right side of said center section, respectively, said base left section being slightly greater in length and width than either said base right section or said base center section, and with the length and width of said base right section and center section being essentially equal; said forward wall bordering said left, center and right base sections and extending between said left and right side walls and said rearward wall bordering an opposed side of said left, center and right base sections in between said left and right side walls; said left side wall bordering a side of said left base section and said right side wall bordering a side of said right base section to form a litter material and animal receiving tray cavity; fold line means in said forward and rearward walls for permitting a portion of the respective forward and rearward walls to fold inwardly responsive to counter clockwise movement of said right side wall; fold line means in said base for permitting said right side wall to be rotated hingedly counterclockwise to a position essentially parallel to and overlying said base center section, whereby said right base section is oriented essentially perpendicular to said base center section, and for permitting said left side wall to be hingedly rotated clockwise and folded over to a position essentially parallel to and overlying said right side wall, responsive to said right side wall being in the counterclockwise rotated position overlying said base center section, whereby said base left section is oriented essentially perpendicular to said base center section, to form a closed package confining said litter material.

8. The invention as defined in claim 7 wherein each of said forward and rearward side walls at an upper end includes a flap integrally connected thereto, said flap extending between and along said base center section and said base right section; said flap including: first fold line means between the juncture of said flap and said wall to provide a hinge connection therebetween to permit said flap to be pivoted relative to said wall; and second fold line means extending perpendicular to said first fold line means and across said flap for permitting said flap to be folded in half in a direction inwardly of said formed cavity responsive to counterclockwise rotation of said right wall.

9. The invention as defined in claim 8 wherein each of said forward and rearward side walls includes a deformable bowable wall portion, said deformable wall portion being located between adjacent wall portions and being more easily deformable than adjacent wall portions and being located adjacent said left side wall and in a position on said respective wall bordering said left base section; said deformable bowable wall portion bowing inwardly of said tray cavity and bending around to invert in position relative to said tray cavity responsive to said left side wall being moved to a position over said right side wall; whereby at least a portion of said deformable bowable wall portion is drawn into a space between other adjacent portions of the respective forward or rearward side wall.

10. The invention as defined in claim 9 wherein said deformable bowable portion includes means for frictionally engaging an adjacent portion of the respective forward or rearward side wall.

11. The invention as defined in claim 7 wherein said right side wall includes an upstanding protruding flap like member located at the top for providing frictional engagement with said left side wall responsive to said left side wall being in a position overlying said right side wall.

12. A sanitary station for an animal containing in combination litter material and a transformable tray, said tray comprising:

a base and four side walls upstanding from said base defining a tray cavity; said walls including a left side wall and a right side wall and forward and rearward side walls;

said base containing a center section and left and right sections located to each of the left and right side of said center section, respectively, said base left section being slightly greater in length and width than either said base right section or said base center section, and with the length and width of said base right section and center section being essentially equal;

said forward wall bordering said left, center and right base sections and extending between said left and right side walls and said rearward wall bordering an opposed side of said left, center and right base sections in between said left and right side walls;

said left side wall bordering a side of said left base section and said right side wall bordering a side of said right base section to form a litter material and animal receiving tray cavity;

fold line means in said base for permitting said right side wall to be rotated hingedly counterclockwise to a position essentially parallel to and overlying said base center section, whereby said base section is oriented essentially perpendicular to said base center section, and for permitting said left side wall to be hingedly rotated clockwise and folded over to a position essentially parallel to and overlying said right side wall, responsive to said right side wall being in the counterclockwise rotated position overlying said base center section, whereby said base left section is oriented essentially perpendicular to said base center section, to form a closed package confining said litter material;

each of said forward and rearward side walls at an upper end includes a flap integrally connected thereto, said flap extending between and along said base center section and said base right section;

said flap including: a first fold line means between the juncture of said flap and said wall to provide a hinge connection therebetween to permit said flap to be pivoted relative to said wall; and second fold line means extending perpendicular to said first fold line means and across said flap for permitting said flap to be folded in half in a direction inwardly of said formed cavity responsive to counterclockwise rotation of said right wall;

each of said forward and rearward side walls includes a deformable bowable wall portion, said deformable wall portion being located between adjacent wall portions and being more easily deformable than adjacent wall portions and being located adjacent said left side wall and in a position on said respective wall bordering said left base section;

said deformable bowable wall portion bowing inwardly of said tray cavity and bending around to invert in position relative to said tray cavity responsive to said left side wall being moved to a position over said right side wall; whereby at least a portion of said deformable bowable wall portion is drawn into a space between other adjacent portions of the respective forward or rearward side wall;

and wherein said deformable wall portions each includes: a plurality of perforated scores extending radially and fanning out at different angles, said angles being 45 degrees or less, from a lower corner of said respective side wall to different spaced positions along an upper end of said side wall; and wherein said flap is carried into said tray cavity responsive to said right side wall portion being positioned over said base center section.

13. The invention as defined in claim 12 wherein each said flap is foldable outwardly orthogonal to said attached one of said respective forward and rearward side walls to stiffen said respective side wall.

14. The invention as defined in claim 12 further comprising fold line means located in said forward side and rearward side walls, said fold line means including: a first set of fold lines located in said forward side wall and a second set of fold lines located in said rearward side wall, said first and second sets of fold lines being substantially identical; each of said first and second sets of fold lines comprising: first and second fold lines located in said respective side wall, each of said first and second fold lines extending from a location at a lower end of said side wall at a position aligned with the connection between the base center and right section with the first fold line extending upwardly therefrom at an angle to a location at an upper end adjacent said right base section and said right side wall, and with the second fold line extending therefrom at an angle in a upwardly direction opposed to the direction of said first fold line to the upper end of said wall at a position approximately in line with the connection between said base center section and said base left section; and a third fold line extending perpendicular to the bottom from the location of said first and second fold lines to the upper end of said wall to define two contiguous triangular wall portions, whereby said two contiguous wall portions fold inwardly of said tray cavity responsive to positioning of said right wall in a position overlying said base center section.

15. The invention as defined in claim 14 wherein each of said first and second sets of fold lines each further comprise: a fourth fold line extending vertically from a location on the lower end of said wall approximately in line with the connection between said base center section and said base left section to the upper end of said wall.

16. The invention as defined in claim 15 wherein said first and second fold lines in said first and second sets of fold lines comprise a ruled score and wherein said third and fourth fold lines in said first and second sets of fold lines comprise a perforated score.

17. The invention as defined in claim 12 wherein said right side wall includes an upstanding protruding flap like member located at the top for providing frictional engagement with said left side wall responsive to said left side wall being in a position overlying said right side wall.

18. In a tray of the type that is transformable into a closed package, said tray including a mid-section, and first and second sections located to either side of said mid section and hingedly connected thereto and having upstanding walls defining a tray cavity, said second section being rotatable in one direction relative to said mid-section about a first hinge axis by ninety degrees, said first section being rotatable in a second direction about a second hinge axis, spaced from and parallel to said first axis, by ninety degrees, said first, second and mid-sections being of approximately equal size width said first section having a wider dimension for permitting said first section to fit over said second section to form a closed container upon completion of rotation of said first section; at least one of said walls including:
first, mid and second wall portions; said first wall portion including: first and second right triangles hingedly connected to define a first essentially square shape; said mid wall portion including: third and fourth right triangles hingedly connected together to define a second essentially square shape; one of said triangles of said first portion being hingedly connected to one of said triangular portions of said mid wall portion; said second wall portion containing fifth and sixth right triangular portions, with one of said fifth and sixth triangular portions being more easily deformable than the other of said triangular portions; said easily deformable one of said fifth and sixth triangular portions bordering being connected to one of said third and fourth triangular portions of said mid wall section.

19. The invention as defined in claim 18 wherein each of said sections includes a moisture barrier coating.

20. The invention as defined in claim 18 wherein said connected ones of said triangular portions of each of said second and mid wall sections being foldable inwardly of said tray cavity relative to said other triangular portions of said second and mid wall sections responsive to rotation of said second wall section, leaving the remaining triangular portions of said respective first and mid wall sections in an unfolded position; and wherein said easily deformable triangular portion of said first wall section is twisted to a reversed position relative to said tray cavity in between said remaining triangular wall portion of said first wall section and an unfolded portion of said mid wall section.

21. The invention as defined in claim 20 wherein said deformable triangular portion includes means for frictionally engaging said unfolded portion of said mid wall section responsive to rotation of said first wall section in said one direction.

22. A unitary paperboard blank containing four corners, top, bottom, left and right edges and a series of score line means for fabricating a transformable package and tray from a single blank comprising:
first (45), second (47) and third (49) straight ruled score line means, said first, second and third score line means extending in a first direction being in parallel and spaced apart essentially equally a predetermined first distance, d1;
said first score line means extending between the left edge of the blank and the right edge of the blank;
a fourth straight ruled score line means (51), said fourth ruled score line means being parallel to and spaced from said third ruled score line means by a second distance, d2, where d2 is slightly larger than d1; said first through fourth score line means being arranged in order of first through fourth;
fifth (53) and sixth (57) straight ruled score line means, said fifth and sixth ruled score line means being in parallel and spaced apart a predetermined third distance, d3, and being oriented perpendicular to and intersecting said second ruled score line means, and extending between said third and first ruled score line means;
seventh (55) and eighth (59) straight ruled score line means, said seventh and eighth ruled score line means being in parallel and spaced apart a predetermined fourth distance, d4; said fourth distance, d4, being slightly greater than said third distance, d3;
said second and third score line means each extending between said fifth and sixth ruled score line means;
said fourth score line means extending between said seventh and eight score line means;
said fifth and sixth score line means and said seventh and eighth score line means being located symmetrically about a centerline of said blank; said seventh score line means extending between a position proximate said third score line means and at least said fourth score line means; and said eighth score line means extending between a position proximate said third score line means and at least said fourth score line means, whereby a slight gap is formed between each of an adjacent end of each of said seventh and fifth score line means and an adjacent end of each of said eighth and sixth score line means, respectively;
a ninth straight perforated score line means (25) extending coaxially with said second score line means between said left end of said second score line means and the left edge of the blank;

a tenth straight perforated score line means (26) extending coaxially with said second score line means between the right side end of said second score line means and the right edge of the blank;

eleventh straight perforated score line means (41) extending between a left end of said third score line means and the left edge of said blank, said eleventh score line means being coaxial with said third score line means;

twelfth straight perforated score line means (42) extending between a right end of said third score line means and the right edge of said blank, said twelfth score line means being coaxial with said third score line means;

a first series of straight angularly spaced score line means (31, 33, 35, 37, 39), said first series comprising a plurality of perforated score line means each extending radially from a common location in proximity of the end of said seventh score line means located by said third score line means to different locations along the left edge of the blank with the furthermost one of said score line means extending to the intersection of the axis of said fourth ruled score line means and the left edge of the blank with the first one thereof being oriented in parallel with and spaced slightly from said eleventh perforated score line means by a distance, d5;

a second series of straight angularly spaced score lie means (32, 34, 36, 38, 40), said second series comprising a plurality of perforated score line means each extending radially from a common location in proximity of the end of said eighth score line means located by said third score line means to different locations along the right edge of the blank with the furthermost one of said score line means extending to the intersection of the axis of said fourth ruled score line means and the right edge of the blank with the first one thereof being oriented in parallel with and spaced slightly from said twelfth perforated score line means by a distance, d5;

a thirteenth straight ruled score line means (21) extending at an angle between the intersection of said ninth perforated score line means and said fifth ruled score line means, and the intersection of said eleventh score line means with the left edge of the blank;

a fourteenth straight ruled score line means (23) extending at a perforated angle between the intersection of said ninth score line means and said fifth ruled score line means and the vicinity of the intersection of said first ruled score line means and the left edge of the blank;

a fifteenth straight ruled score line means (22) extending at a predetermined angle between the intersection of said tenth score line means and said sixth ruled score line means and the intersection of said twelfth score line means and the right edge of the blank; and a sixteenth straight ruled score line means (24) extending at a predetermined angle between the intersection of said tenth score line means and said sixth score line means to the intersection of said first score line means and the right edge of said blank.

23. The invention as defined in claim 22, further comprising:

a cut score line means (61) extending between the intersection of said seventh and fourth ruled score line means and the most adjacent corner of said blank;

a second cut score line means (62) extending between the intersection of said eighth and fourth ruled score line means and the most adjacent corner of said blank;

a third cut score line means (63) extending between the intersection of said first and fifth ruled score line means and the adjacent corner of said blank; and a fourth cut score line means (64) extending between an intersection of the first and sixth ruled score line means and the adjacent corner of said blank.

24. The invention as defined in claim 22 further comprising:

a first protruding portion located at a left side of said blank, said protruding portion containing tapered sides; said blank further containing a seventeenth (27) perforated score line means extending perpendicular to and crossing said ninth perforated score line means extending between said tapered sides of said protruding portion to define a flap portion; and a second protruding portion located at a right side of said blank, said second protruding portion containing tapered sides; said blank further containing an eighteenth (50) perforated score line means extending perpendicular to and crossing said tenth perforated score line means extending between said tapered sides of said second protruding portion to define a second flap portion.

25. The invention as defined in claim 24 wherein said thirteenth score line means and said ninth score line means define a first angle therebetween and wherein said fourteenth score line means and said ninth score line means form a second angle therebetween; and wherein said first angle is equal to said second angle.

26. The invention as defined in claim 24 wherein said ninth perforated score line means bisects said first protruding portion and wherein said tenth perforated score line means bisects said second protruding portion.

27. The invention as defined in claim 26 wherein said fourth score line means is spaced from said top edge of the blank by a predetermined distance, d6; said first score line means is spaced from said bottom edge by a predetermined distance d7; and wherein distance d6 is slightly larger than predetermined distance d7.

28. The invention as defined in claim 26 wherein said blank further includes a third protruding portion located between said first score line means and said bottom edge defining a flap.

29. The invention as defined in claim 22 further comprising:

a moisture barrier coating covering at least a portion of said blank.

30. The method for sanitary handling of used litter material supported in a tray on a surface by transforming said tray into a closed litter material confining package without requiring the handler to touch said litter material, said tray being of the type that contains a mid-section, and first and second sections hingedly connected respectively to said mid-section to form a unitary assembly, with each of said sections including a base, with the base of all said sections collectively defining a bottom to said tray, with said first and second sections being located on right and left sides, respectively, of said mid-section, with said first and second sections being hingedly connected to said midsection by spaced parallel hinge means, and with said second section having slightly larger dimensions than said first section, comprising the steps of:
- raising the end of the tray at which the first section is located from a horizontal position on said surface to pivot the entire bottom of the tray about its opposite edge to cause the litter material to move to the second section and then lowering the tray to the horizontal position on the surface;
- rotating said first second of said tray relative to said mid-section about a first hinge axis therebetween by ninety degrees to thereby place the base of the first section perpendicular to the base of said midsection;
- pivoting the tray from the end of the tray at which said second section is located to a substantially vertical position to place the second section and the base of the midsection in a substantially vertical position essentially perpendicular to the base of said first section and with the base of said first section remaining resting on said surface, whereby said litter material located in said second section moves into said midsection; and
- rotating said second section about a second hinge axis between said midsection and said second section by ninety degrees to place said second section in confronting relationship to said first section and form a closed litter material confining package, whereby said second section fits over said first section to form a closed package upon completion of rotation of said second section.

* * * * *